United States Patent
Chalabi et al.

(10) Patent No.: US 9,540,236 B2
(45) Date of Patent: Jan. 10, 2017

(54) SYNTHESIS GAS PROCESSING AND SYSTEM USING COPPER CATALYST IN TWO STEP REACTIONS AT 475-525° C. AND 250-290° C.

(75) Inventors: Rifat Al Chalabi, Nottingham (GB); Ophneil Henry Perry, Nottingham (GB); Ke Li, Nottingham (GB)

(73) Assignee: Chinook End-Stage Recycling Limited, Nottingham (GB)

( * ) Notice: Subject to any disclaimer, the term of this patent is extended or adjusted under 35 U.S.C. 154(b) by 233 days.

(21) Appl. No.: 14/116,878

(22) PCT Filed: Apr. 27, 2012

(86) PCT No.: PCT/GB2012/000392
§ 371 (c)(1),
(2), (4) Date: Nov. 26, 2013

(87) PCT Pub. No.: WO2012/153080
PCT Pub. Date: Nov. 15, 2012

(65) Prior Publication Data
US 2014/0070144 A1    Mar. 13, 2014

(30) Foreign Application Priority Data
May 11, 2011    (GB) .................................. 1107813.6

(51) Int. Cl.
*C01B 3/02*    (2006.01)
*B01J 23/72*    (2006.01)
(Continued)

(52) U.S. Cl.
CPC ................ *C01B 3/02* (2013.01); *B01J 15/005* (2013.01); *B01J 19/0013* (2013.01); *B01J 23/72* (2013.01);
(Continued)

(58) Field of Classification Search
CPC ............ C01B 3/02; C01B 31/18; C01B 31/20; C01B 3/16; C01B 3/18; B01J 2219/00229; B01J 2219/00108; B01J 2219/00186; B01J 2219/00159; B01J 2219/00006; B01J 23/72; B01J 2219/00164; B01J 15/005; B01J 19/0013; C10K 3/02
See application file for complete search history.

(56) References Cited

U.S. PATENT DOCUMENTS

2004/0191164 A1*    9/2004    Schiodt et al. ............ 423/648.1

FOREIGN PATENT DOCUMENTS

| CN | 1880414 | 12/2006 |
|---|---|---|
| CN | 100350023 | 11/2007 |

(Continued)

OTHER PUBLICATIONS

Rodriguez et al. "Reduction of CuO in H2 . . ." Aug. 2002, Catalysis letters, vol. 85, Nos. 3-4, p. 247-254.*

(Continued)

*Primary Examiner* — Stanley Silverman
*Assistant Examiner* — Syed Iqbal
(74) *Attorney, Agent, or Firm* — Stetina Brunda Garred and Brucker; Mark B. Garred (57) ABSTRACT

Invention presents a method of increasing the CO to $H_2$ ratio of syngas. The method comprises passing syngas over a first rector (10) containing Cu at a first temperature effective for the reaction of $CO_2$ within the syngas with the Cu to form copper oxide and CO. The temperature of the syngas is then reduces to a second temperature effective for the for the reaction of hydrogen within the syngas with copper oxide to form Cu and $H_2O$. The syngas is then passed over a second rector (12) containing copper oxide so that the $H_2$ within the syngas reacts with the copper oxide.

19 Claims, 4 Drawing Sheets

(51) Int. Cl.
*C01B 3/16* (2006.01)
*C01B 3/18* (2006.01)
*C01B 31/20* (2006.01)
*C10K 3/02* (2006.01)
*C01B 31/18* (2006.01)
*B01J 15/00* (2006.01)
*B01J 19/00* (2006.01)

(52) U.S. Cl.
CPC . *C01B 3/16* (2013.01); *C01B 3/18* (2013.01); *C01B 31/18* (2013.01); *C01B 31/20* (2013.01); *C10K 3/02* (2013.01); *C10K 3/026* (2013.01); *B01J 2219/00006* (2013.01); *B01J 2219/00108* (2013.01); *B01J 2219/00159* (2013.01); *B01J 2219/00164* (2013.01); *B01J 2219/00186* (2013.01); *B01J 2219/00202* (2013.01); *B01J 2219/00229* (2013.01)

(56) References Cited

FOREIGN PATENT DOCUMENTS

EP 1445235 3/2012
SU 1799865 3/1993

OTHER PUBLICATIONS

Chinese Office Action; Application No. 2012800343890; dated Jan. 9, 2014, 12 Pages.
Combined Search and Examination Report under Sections 17 and 18(3) in relation to Application No. GB1107813.6 dated Jun. 30, 2011; 5 pages.
International Search Report and Written Opinion International Application No. PCT/GB2012/000392 dated Aug. 28, 2012; 13 pages.
Ladebeck, J.R. and Wagner, J.P., "Catalyst Development for Water—Gas Shift. Handbook of Fuel Cells." Dec. 15, 2010; 2 pages.
Yue Li, Qi Fu, Aria Flytzani-Stephanopoulos., "Low-Temperature Water-Gas Shift Reaction Over Cu- and Ni-loaded cerium oxide catalysts," Applied Catalysis B: Environmental; vol. 27, Issue 3, Aug. 7, 2000, 2 pages.
Eurasian Patent Office Action for Application No. 1311853/56EA mailed Apr. 30, 2015.
"Handbook of fuel cells-fundamentals, Technology and Applications," 2003, John Wiley and Sons, Chinchester, XP002681948, vol. 3, pp. 190-201.

* cited by examiner

SYNTHESIS GAS PROCESSING AND SYSTEM USING COPPER CATALYST IN TWO STEP REACTIONS AT 475-525° C. AND 250-290° C.

CROSS-REFERENCE TO RELATED APPLICATIONS

The present application claims priority to International Application No. PCT/GB2012/000392 which was filed on Apr. 27, 2012, and claims priority to the Great Britain Patent Application No. 1107813.6 filed May 11, 2011.

BACKGROUND OF THE INVENTION

1. Technical Field of the Invention

The present application relates to the thermal conversion of organic material, for example organic based waste, biomass, etc. to syngas. In particular it relates to the condition of syngas to alter the $H_2$ and CO content thereof.

2. Description of the Related Art

Syngas composition is mainly affected by: feedstock characteristics (elemental composition, caloric values, moisture content, physical properties) of the material being thermally converted, gasification conditions (oxidants, temperature, pressure, residence time), and the type of gasifiers used (fixed bed, fluidized bed, entrained flow, batch reactor). However, once the factors mentioned above are determined, the syngas composition, especially $H_2$, CO, $CO_2$, and $H_2/CO$ ratio will be dictated by thermodynamic equilibrium within a certain range.

The syngas composition will often not match specific gas requirements for industrial applications, for example a syngas engine effective for the conversion of syngas to electrical energy will require a specific syngas composition in order to be effective and to run efficiently. The exact requirement will be dependent upon the industrial process but will often not be the same as the natural composition of the gas produced.

Accordingly there is a need to further control or alter the syngas composition to meet specific requirements ($H_2$ concentration, $H_2/CO$ ratio) for industrial applications. This can be achieved by altering the process parameters of the syngas production but such a solution requires that the production of syngas be controlled on the gas composition rather than on system efficiency and to do so will inherently introduce inefficiencies into the processing of the organic material, which is not desirable.

The present invention mitigates, at least in part, the above mentioned problems with prior systems.

SUMMARY OF THE INVENTION

According to a first aspect of the present invention there is provided a method of increasing the CO to $H_2$ ratio of syngas, the method comprising: passing syngas over a first rector containing Cu at a first temperature effective for the reaction of $CO_2$ within the syngas with the Cu to form copper oxide and CO; reducing the temperature of the syngas to a second temperature effective for the for the reaction of hydrogen within the syngas with copper oxide to form Cu and $H_2O$; and; passing the syngas over a second rector containing copper oxide so that the $H_2$ within the syngas reacts with the copper oxide.

Preferably the method further comprises, prior to its passage through the first reactor, passing the syngas through a first heat exchanger to reduce its heat to the first temperature. The first temperature may be in the range of 475° C. to 525° C., preferably the first temperature is 500° C.±5° C.

Preferably reducing the temperature of the syngas to a second temperature comprises passing the syngas through a second heat exchanger. The second temperature may be in the range of 250° C. to 290° C.; preferably the second temperature is 270° C.±5° C.

The method may further comprise passing the syngas exiting the second reactor through a third heat exchanger to increase its temperature to substantially the first temperature and recirculating the syngas through the first and second reactor to achieve a desired one of: $H_2$ content, CO content or CO to $H_2$ ratio; and, once the desired $H_2$ content, CO content or CO to $H_2$ ratio has been achieved, withdrawing syngas. The composition of the syngas downstream of the second reactor may be monitored and the recirculation of the syngas may be controlled to maintain the desired one of: $H_2$ content, CO content or CO to $H_2$ ratio.

A preferred embodiment of the method may further comprise reversing the flow of syngas through the system so that the syngas at the first temperature is directed to the second reactor, the temperature of the syngas is then reduce and the reduced temperature syngas is then fed to the first reactor. The reverse flow of gas at the first temperature through the second reactor causes $CO_2$ within the syngas to react with the Cu to form copper oxide and CO, thereby regenerating the copper oxide in the second reactor and the reverse flow of gas at the second temperature through the first reactor causes $H_2$ within the syngas to react with the copper oxide to form Cu and $H_2O$, thereby regenerating the copper in the first reactor.

The change of composition of the syngas over time may be monitored to indicate the reactivity of the material within the reactors and when the reactivity falls below a desired reactivity, the direction of flow through the reactors may be reversed.

The method may comprise: monitoring the composition of the syngas to determine if the reaction rate of the copper oxidation lags the reaction rate of the copper oxide reduction, and if the reaction rate of the copper oxidation does lag the reaction rate of the copper oxide reduction, decreasing the heat extracted by second heat exchanger to increase the second temperature. Preferably monitoring the composition of the syngas to determine if the reaction rate of the copper oxidation lags the reaction rate of the copper oxide reduction comprises identifying a combination of reducing CO value trend with at least one of low $H_2$ value and increased $H_2O$.

The method may comprise: monitoring the composition of the syngas to determine if the reaction rate of the copper oxide reduction lags the reaction rate of the copper oxidation and, if the reaction rate of the copper oxide reduction does lag the reaction rate of the copper oxidation, decreasing the heat extracted by second heat exchanger to decrease the first temperature. Preferably monitoring the composition of the syngas to determine if the reaction rate of the copper oxidation lags the reaction rate of the copper oxide reduction comprises identifying a combination of high CO value with at least one of increasing $H_2$ value trend and reducing $H_2O$ trend.

The method may include a cleaning cycle which comprises: isolating the reactors and the first heat exchanger from the flow of syngas; and passing Nitrogen gas in excess of 650° C. through the reactors to remove carbon deposits therefrom. The material within the reactors may be vibrated to assist in the removal of carbon deposits therefrom.

Preferably the method comprises pyrolysing or gasifying organic material to produce hot syngas containing CO in excess of 30%, $H_2$ in excess of 20%, $CO_2$ and $H_2O$, for use in the method.

According to as second aspect of the invention there is provided an apparatus for performing the method of the first aspect of the invention, the apparatus comprising: a first heat exchanger having an inlet and an outlet for hot syngas; a first reactor containing Cu having an inlet for receiving gas from the first heat exchanger, and an outlet; a second heat exchanger for receiving syngas from the outlet of the first reactor; a second reactor containing copper oxide and having an inlet for receiving syngas from the heat exchanger and an outlet; and control means configured to control the first heat exchanger to reduce the temperature of syngas passing therethrough to a first temperature effective for the reaction of $CO_2$ within the syngas with the Cu in the first reactor to form copper oxide and CO, and to control the second heat exchanger to reduce the temperature of syngas passing therethrough to a second temperature effective for the for the reaction of $H_2$ within the syngas with the copper oxide to form Cu and $H_2O$.

Preferably the control means is operative to control the first heat exchanger to reduce the temperature of syngas to within the range of 475° C. to 525° C., more preferably 500° C.±5° C.

Preferably the control means is operative to control the second heat exchanger to reduce the temperature of syngas to within the range of 250° C. to 290° C., more preferably 270° C.±5° C.

The apparatus may further comprise: a syngas recirculation flow path from the outlet of the second reactor to the inlet of the first reactor for recirculation syngas through the reactors; and a third heat exchanger located in the syngas recirculation flow; sensor means for sensing one or more of: $H_2$ content, CO content, CO to $H_2$ ratio, and $H_2O$ content of the syngas; wherein the control means is configured to control the recirculation of gas through the syngas recirculation flow path in response to the sensed one or more of: $H_2$ content, CO content, CO to $H_2$ ratio to achieve a desired one or more of: $H_2$ content, CO content, CO to $H_2$ ratio; the apparatus further comprising a conditioned syngas outlet for withdrawing syngas.

The apparatus may further comprise valve means operable to reverse the flow of syngas through the first and second reactor and the second heat exchanger so that the syngas at the first temperature passes through the second reactor and the syngas at the second temperature passes through the first reactor.

Preferably the control means is configured to monitor the change of composition of the syngas over time to indicate the reactivity of the material within the reactors, and when the reactivity falls below a desired reactivity, activates the valve means to reverse the direction of flow through the reactors.

Preferably the control means is further configured to: monitor the composition of the syngas over time to determine if the reaction rate of the copper oxidation lags the reaction rate of the copper oxide reduction by identifying a combination of reducing CO value trend with at least one of low $H_2$ value and increased $H_2O$; and if the reaction rate of the copper oxidation does lag the reaction rate of the copper oxide reduction, control the second heat exchanger to increase the second temperature.

The apparatus may comprise a third heat exchanger bypass conduit and wherein the control means is further configured to: monitor the composition of the syngas over time to determine if the reaction rate of the copper oxide reduction lags the reaction rate of the copper oxidation by identifying a high CO value in combination with at least one of increasing $H_2$ value trend and reducing $H_2O$ trend; and if the reaction rate of the copper oxide reduction does lag the reaction rate of the copper oxide reduction, bypass the third heat exchanger to decrease the first temperature.

In one preferred embodiment the apparatus further comprises: valve means operative to isolate the reactors and the first heat exchanger from the flow of syngas; a $N_2$ supply conduit; valve means operative to pass Nitrogen gas in excess of 650° C. through the reactors to remove carbon deposits therefrom. Preferably the apparatus further comprises a vibrator to vibrate the material within the reactors to assist in the removal of carbon deposits therefrom.

In a preferred embodiment the apparatus also includes a pyrolyser for pyrolysing organic material to produce hot syngas containing CO in excess of 30%, $H_2$ in excess of 20%, $CO_2$ and $H_2O$.

BRIEF DESCRIPTION OF THE DRAWINGS

An embodiment of the invention is described below, by way of example, with reference to the drawings in which.

DETAILED DESCRIPTION OF THE INVENTION

Figure 1:
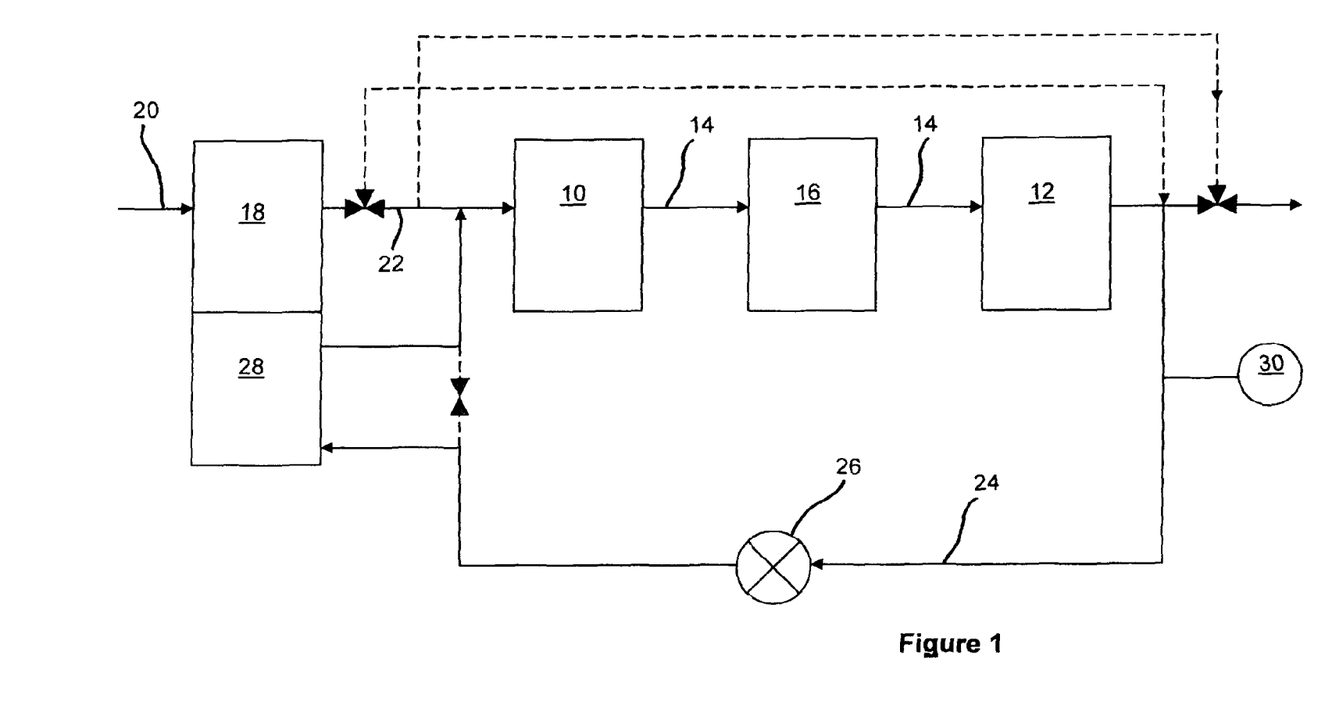
FIG. 1 shows a schematic diagram of an apparatus of the invention in a first mode of operation.

Referring to FIG. 1 a schematic diagram of the apparatus of the invention is shown. The apparatus comprises a first reactor 10 and a second reactor 12 in fluid communication with each other via conduit 14. Interposed between the reactors 10 and 12 is a heat exchanger 16.

The apparatus also comprises a heat exchanger 18 having an inlet 20 for receiving hot syngas and an outlet conduit 22 for delivering syngas from the heat exchanger 18 to the reactor 10. A conduit 24 having a circulation fan 26 therein and passing through a heat exchanger 28 forms a recirculation flow path between reactors 10 and 12.

The reactors 10 and 12 contain a mixture containing copper and copper oxide. One of the reactors 10 will contain more copper and the other reactor 12 will contain more copper oxide at the start of the process.

Hot syngas at a temperature of approximately 900° C., rich in CO (greater than 30%) and $H_2$ (greater than 20%), with a balance of $CO_2$, $H_2O$, and hydrocarbon gasses, together with other minor gas components, enters the first heat exchanger 18, which may be of any known heat exchanger type suitable for use with the hot gas composition. As the hot syngas passes through the heat exchanger 18 it gives up some of its heat so that when it exits the heat exchanger 18 via conduit 22 it is approximately 500° C. The gas at 500° C. has a pressure of approximately one atmosphere and passes through the reactor 10 such that it has a residence time of less than two seconds therein. These conditions bias the reaction occurring within the reactor 10 towards oxidation of the copper, the reaction being:

$$Cu + CO_2 \rightarrow CuO + CO \qquad \text{(reaction 1)}$$

Accordingly, in the first reactor 10 copper is oxidized into copper oxide and, in the process, oxygen is stripped from the carbon dioxide converting it to carbon monoxide which is a combustible gas.

The syngas containing a lower $CO_2$ and a higher CO component exits reactor 10 via conduit 14 and pass through heat exchanger 16. Heat exchanger 16 extracts heat from the syngas flowing therethrough such that the temperature of the outlet flow of syngas from the heat exchanger 16 is approximately 270° C. This lower temperature syngas passes through the reactor 12 at a pressure of approximately one atmosphere and has a residence time therein of less than two seconds. These conditions bias the reaction occurring within the reactor 12 towards reduction of the copper oxide, the reaction being:

$$CuO + H_2 \rightarrow Cu + H_2O \quad \text{(reaction 2)}$$

At this lower temperature the hydrogen within the gas flow reacts with the copper oxide within the reactor to form copper and steam.

The reactions occurring in the reactors 10, 12 are reversible redox (reduction-oxidation) reactions in which the gas that flows therethrough will react according to one of the above stated reactions. The reaction which takes place within the reactor will be determined by the temperature, and other conditions, of the gas passing therethrough. In the reactor which receives the syngas at a higher temperature the conditions bias the redox reaction heavily towards oxidation and in the other reactor when the syngas temperature is approximately 270° C. the conditions therein bias the redox reaction heavily towards production.

The two reactions occurring in the reactors lead to an increase in the carbon monoxide content of the gas passing therethrough and a reduction in the hydrogen content of the syngas. The objective of this process, is to control the $H_2$ content and, more specifically to decrease it continuously but at a controlled rate, while additional CO is produced, hence shifting the overall syngas content to lower $H_2/CO$ ratio without reducing the calorific value by simple $H_2$ depletion, since the process enriches the CO in the syngas via reaction 1. The combined reaction 1 and reaction 2 will act in a similar way the Reversion Water Gas Shift Reaction as below:

$$H_2 + CO_2 \rightarrow CO + H_2O$$

The Cu and the CuO can be considered to act as catalysts in the overall reaction above. The two step process is designed to achieve higher $H_2$ reduction efficiency by selecting different reactor temperatures and preferred catalyst compositions. Furthermore this two-step process allows greater control over the reactions occurring and steer the reaction equilibrium away from forming liquid products, such as Methanol and other small hydrocarbons.

The system is provided with a recirculation conduit 24 that leads from an outlet of the reactor 12 to the inlet of reactor 10. This conduit passes through a third heat exchanger 28 which raises the temperature of the gasses back to approximately 500° C. The heat exchangers 18 and 28 may form part of one and the same heat exchanger, the heat extracted from the incoming gasses in heat exchanger 18 being used to raise the temperature of the syngas in the heat exchanger 28, thereby preventing the necessity for the input of extra heat to the system to raise the temperature of the re-circulating gas back to the required approximate 500° C.

A re-circulation fan 26 is provided within the conduit 24 for re-circulating gas through the reactors 10, 12 and heat exchanger 16. A gas monitor 30 monitors the quality of the gas circulating within the system, for example by detecting the amounts of one or more of hydrogen, carbon monoxide, carbon dioxide, hydrogen to carbon monoxide ratio or steam. The re-circulating fan 26 is controlled by a controller (32, FIG. 3) in dependence upon the detected gas quality. In use the controller controls the fan 26 to re-circulate a variable amount of the gas passing through the system internally so that a required syngas quality can be achieved.

Reverse Flow Regeneration

Figure 2:
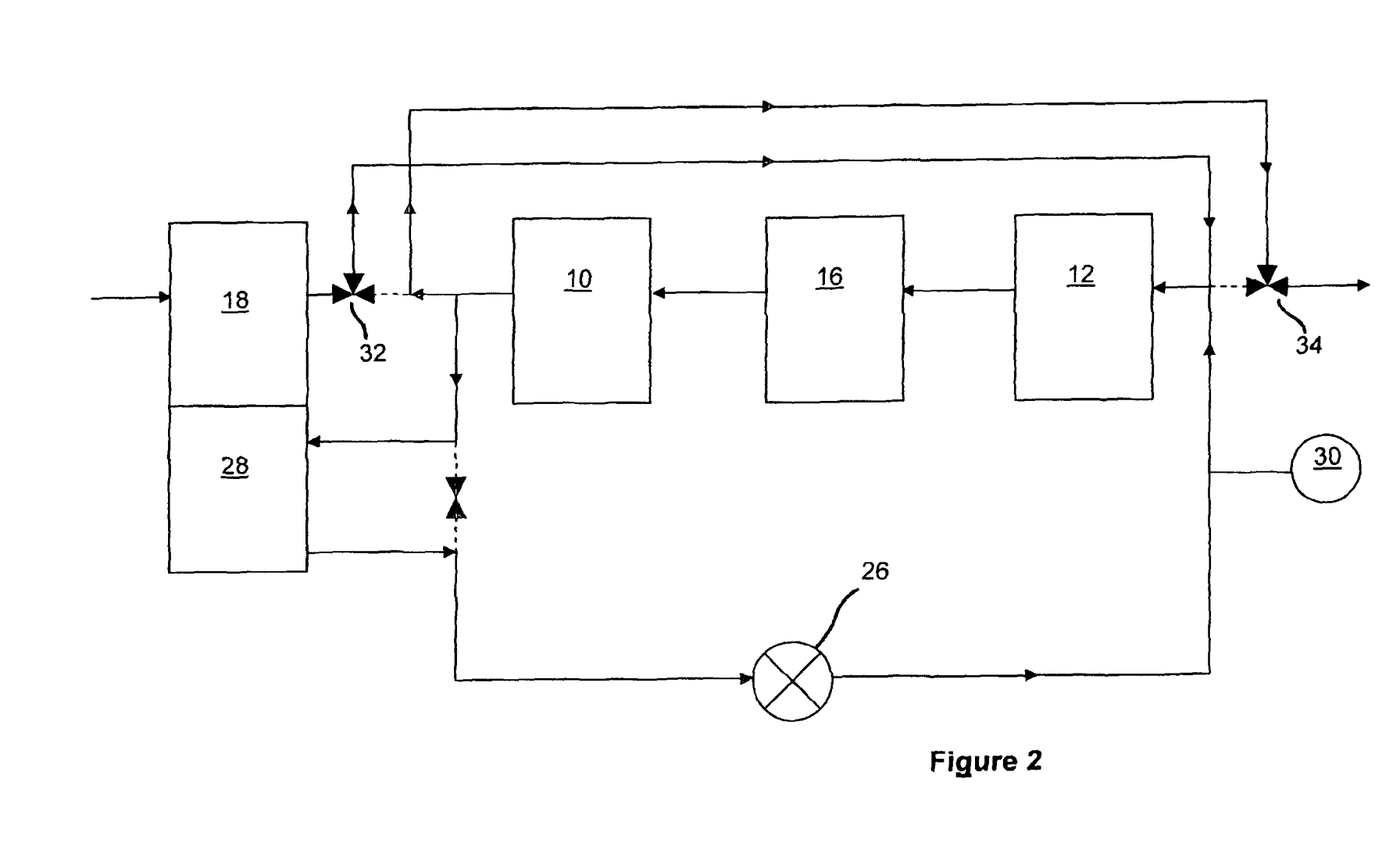
FIG. 2 shows a schematic diagram of an apparatus of the invention in a second mode of operation regenerating the reactors.

Over time the copper within the reactor 10 will become oxidised to form copper oxide and the copper oxide within reactor 12 will be reduced to copper resulting in, over time, a reduction in the effect of the system. The sensor 30 will detect this by constantly monitoring the gas quality. This for example can be done by monitoring the carbon monoxide and hydrogen values over time in combination with the amount of gas which has been recycled and, if a greater and greater amount of gas is required to be recycled to give the required CO and $H_2$, or if, despite the re-circulating of the gas the hydrogen and carbon monoxide values slowly start to revert to those of the incoming syngas then it can be determined that the reactions have slowed down or stopped:

$$Cu + CO_2 \rightarrow CuO + CO \ldots \text{Slowing down/not reacting} \quad \text{Reaction 1:}$$

$$CuO + H_2 \rightarrow Cu + H_2O \ldots \text{Slowing down/not reacting} \quad \text{Reaction 2:}$$

and that the majority of the material within the reactors has been reacted, or at least a sufficient amount of material within the reactors 10, 12 has been reacted such that the reaction rate of the remaining material therein is no longer producing the required effect, then, as is shown in FIG. 2, valves 32 and 36 can be operated to reverse the direction of syngas flow through the reactors 10 and 12 to regenerate the copper and copper oxide in the reactors.

This reverse regeneration converts the copper that has accumulated in the reactor 12 to copper oxide and the copper oxide that has accumulated in reactor 10 to copper. This is effected by the reverse of the syngas flow such that the gas passing through the reactor 12 is at a temperature that the reaction therein is oxidation dominated and that the reaction in the other reactor 10 which receives the syngas at a lower temperature after it has passed through heat exchanger 16 is reduction dominated. In this way both the reactors 10, 12 are regenerated.

As the system continues to monitor the quality of gas the direction of flow through the system can be moved from one direction to the other so as to constantly deplete and regenerate the copper and copper oxide in the two reactors 10, 12.

The recirculation fan 26 operates in a reverse direction so that some of the syngas is re-circulated through the reactors in the opposite direction to that shown in FIG. 1.

Reaction Rate Catch-Up

It is possible that during the process that the reaction in one of the reactors 10, 12 may lag behind the reaction in the other reactor such that, for example, if the oxidation reaction lags behind the reduction reaction then it will be seen that the carbon monoxide level in the gas is not increasing, or not increasing as much, and the hydrogen content in the gas is decreasing in a first scenario as follows:

$$Cu + CO_2 \rightarrow CuO + CO \ldots \text{Slowing down} \quad \text{Reaction 1:}$$

$$CuO + H_2 \rightarrow Cu + H_2O \ldots \text{Still Functioning} \quad \text{Reaction 2:}$$

Figure 3:
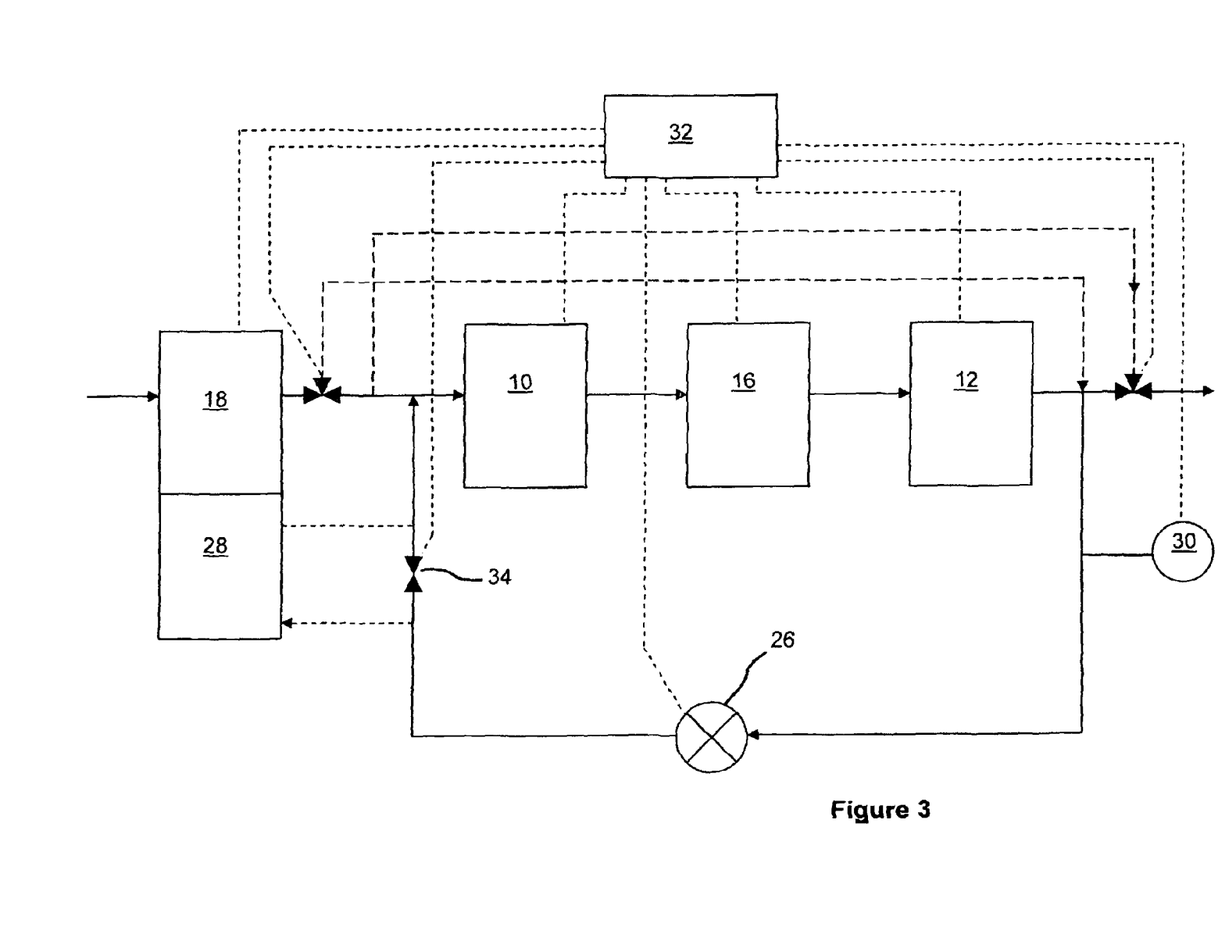
FIG. 3 shows a schematic diagram of an apparatus of the invention in a third mode of operation.

On the other hand, if the reduction reaction is lagging behind the oxidation reaction then it will be seen that the hydrogen content of the gas is no longer reducing, or not reducing as much, while the carbon monoxide content of the gas continues to increase in a first scenario as follows:

Cu+CO$_2$→CuO+CO . . . Still Functioning     Reaction 1:

CuO+H$_2$→Cu+H$_2$O . . . Slowing down     Reaction 2:

Referring to FIG. 3, if the oxidation reaction (reaction 1) is lagging behind the reduction reaction (reaction 2) as stated in the first scenario then a control system comprising a controller 32 reduces the amount of heat being extracted from the syngas by the second heat exchanger 16 so that the temperature of the exiting gas is between 270° C. and 500° C. It will be appreciated that the control system shown in FIG. 3 is present in the invention but is omitted form the other figures for the sake of clarity. The controller receives signals form the inline monitor 30 and sends signals to the various valves and heat exchangers of the apparatus. As the hot gas flowing into the reactor 12 is then at a temperature within this region, above the 270° C. used to bias the reaction heavily towards the reduction reaction the increase in the temperature of this gas will move the reaction away from the reduction reaction towards the oxidation reaction and thereby supplement the effects of the reactor 10. In such a mode of operation, the gas in the range of 270° C. to 500° C. passing through the reactor 12 will have both oxidation and reduction reactions occurring therein. This effectively allows the oxidation reaction to catch up with the reduction reaction as the conditions bias the reactions in both reactors more towards oxidation.

If, on the other hand, the reduction reaction (reaction 2) is lagging behind the oxidation reaction (reaction 1) as shown in the second scenario then bypass valve 34 is opened, at least in part, so that not all the gas re-circulating in the re-circulation conduit 24 passes through heat exchanger 28. In this way the mixture of incoming gas and re-circulated gas being fed into the reactor 10 has a temperature below 500° C. in particular between 270° C. and 500° C. As the temperature of the syngas entering the reactor 10 is reduced the bias of the redox reaction therein is shifted away from oxidation in the direction of reduction, although both oxidation and reduction reactions will be occurring within the reactor 10. In this mode of operation a larger amount of material is available for the reduction reaction and a smaller amount of material is available for the oxidation reaction, thereby allowing the reduction reaction to catch up with the oxidation reaction.

The extent to which one reaction is lagging behind the other can be determined by measuring the quality of gas circulating within the system. If one of the reactions starts to slow down while the other reaction is still functioning then it can be determined that one of the reactions is lagging behind the other and the controller takes the appropriate action.

It will be appreciated that this control can be effected irrespective of the direction of flow through the reactors 10, 12.

Carbon Clean Up

The pyrolysis reaction will unavoidably produce at least some soot which will become entrained within the gas flowing therethrough and, by default, the gas flowing into the reactors 10, 12. This carbon flows over the interior of the reactors and forms a coating on the surfaces of the material within the reactors thereby, over time, reducing the effectiveness of the system.

Figure 4:
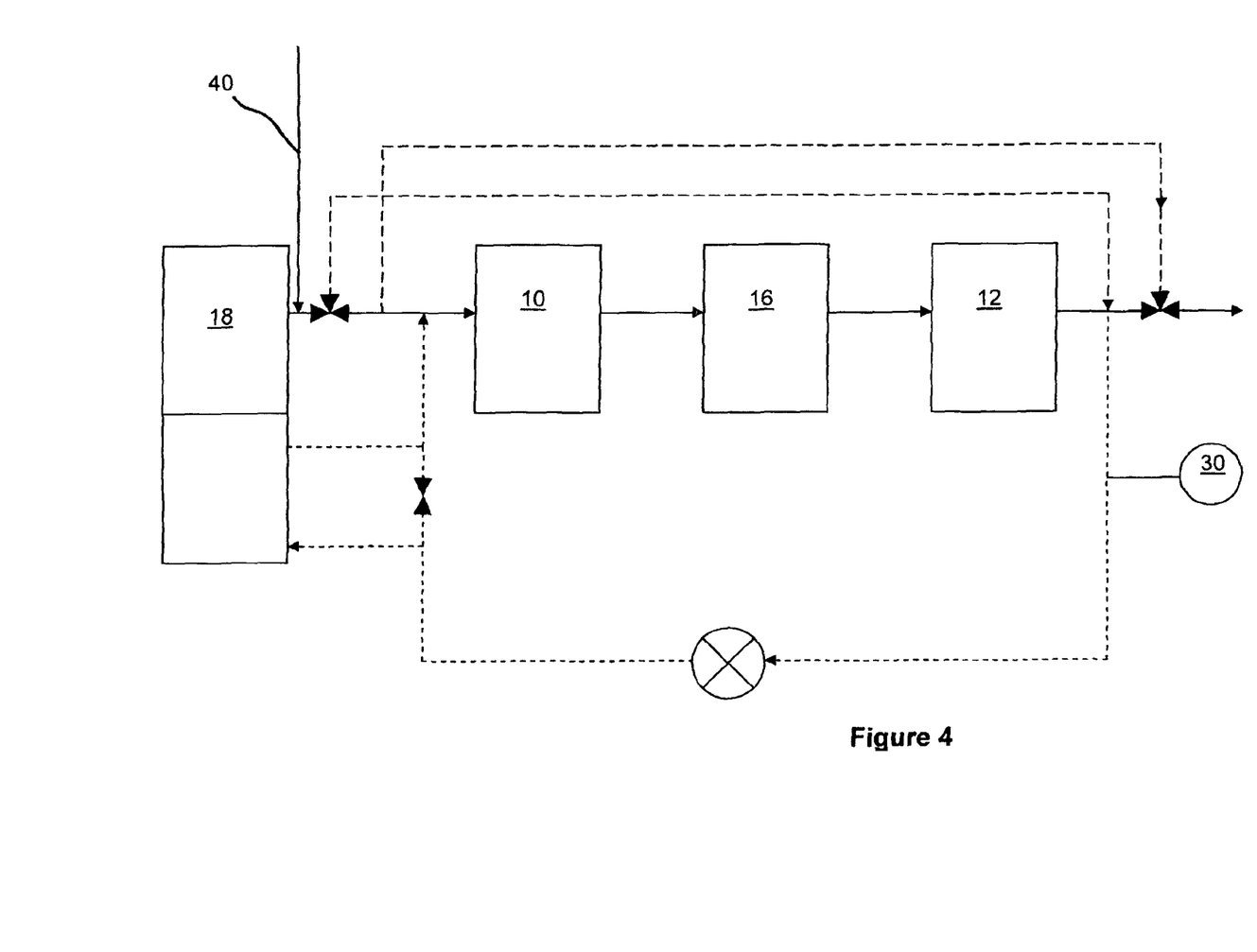
FIG. 4 shows a schematic diagram of an apparatus of the invention in a forth mode of operation, cleaning carbon from the system.

Referring to FIG. 4, if an overall reduction in the efficiency of the system is detected, by sensor 30, for example less conversion of H$_2$ to CO irrespective of reversal of the flow path through the reactors, the system can be taken offline by isolating the supply of syngas thereto. A nitrogen supply conduit 40 supplies hot nitrogen gas to the system and circulates it therethrough. Simultaneously the heat exchangers 16, 28 are taken offline and the gas flowing therethrough therefore has an increased temperature preferably of approximately 600° C. As the nitrogen passes through the reactors 10, 12 it forces the entrainment of, or the gasification of, any carbon materials which are lining the system. To assist the efficient separation of carbon from the material in the reactor 10, 12 the floor bed of the reactor may be vibrated so as to vibrate the copper and/or copper oxide therein. Although the remaining conduits are shown as being offline it will be appreciated that the Nitrogen can be circulated through other conduits of the system to assist in cleaning them.

According to the invention it is possible, as described above, to decrease the hydrogen content in syngas and enrich the carbon monoxide by disassociating carbon dioxide and copper in a controlled manner in which the reduction and oxidation reactions of the redox reaction occur simultaneously in series with one another in separate reactors. This achieves greater control of the redox reactions by enabling individual selection of favourable reactor temperatures of the reaction in each reactor.

By controlling the reactor temperatures and pressures the two step copper redox reaction claimed herein is fully controllable to bias the reaction in the two reactors that simulates the reversible gas shift reaction. However, the two-step process disclosed herein promotes the reversible gas shift reaction without operating at high temperature or higher pressures, yet achieves a higher conversion of carbon dioxide to carbon monoxide and a higher effectiveness of H$_2$ reduction.

By separating the two steps of the describe reaction and altering the temperatures of the gas that is flowing through the two reactors where these two reactions take place, the system is simply operative to obtain a required hydrogen to carbon monoxide ratio within the syngas.

Furthermore, by splitting the reactors such that one half of the redox reaction takes place in each reactor and by reversing the gas flow through the two reactors, the catalytic material within both of these reactors is regenerated. As is described above, this can be done automatically without having to take the reactors offline or replacing them with separate regenerated reactions, i.e. the material within the reactors is constantly being depleted and regenerated as the direction of the flow therethrough is switched from one direction to the other. The apparatus and method allow the chemical energy in hydrogen to be transformed into chemical energy within carbon monoxide in a way which does not compromise the efficiency of the gasification or pyrolysis process.

The invention claimed is:

1. A method of increasing the CO to H$_2$ ratio of syngas, the method comprising:
    passing syngas over a first reactor containing Cu at a first temperature effective for the reaction of CO$_2$ within the syngas with the Cu to form copper oxide and CO;
    reducing the temperature of the syngas to a second temperature effective for the reaction of hydrogen within the syngas with copper oxide to form Cu and H$_2$O; and
    passing the syngas over a second reactor containing copper oxide so that the H$_2$ within the syngas reacts with the copper oxide.

2. The method of claim 1 further comprising, prior to its passage through the first reactor, passing the syngas through a first heat exchanger to reduce its heat to the first temperature.

3. The method of claim 1 wherein the first temperature is in the range of 475° C. to 525° C.

4. The method of claim 3 wherein the first temperature is 500° C.

5. The method of claim 1 wherein reducing the temperature of the syngas to a second temperature comprises passing the syngas through a second heat exchanger.

6. The method of claim 1 wherein the second temperature is in the range of 250° C. to 290° C.

7. The method of claim 6 wherein the second temperature is 270° C.

8. The method of claim 1 further comprising:
passing the syngas exiting the second reactor through a third heat exchanger to increase its temperature to substantially the first temperature and recirculating the syngas through the first and second reactor to achieve a desired one of $H_2$ content, CO content or CO to $H_2$ ratio; and
once the desired $H_2$ content, CO content or CO to $H_2$ ratio has been achieved, withdrawing syngas.

9. The method of claim 8 further comprising monitoring the composition of the syngas downstream of the second reactor and controlling the recirculation of the syngas to maintain the desired one of $H_2$ content, CO content or CO to $H_2$ ratio.

10. The method of claim 1 further comprising reversing the flow of syngas through the system so that the syngas at the first temperature is directed to the second reactor, the temperature of the syngas is then reduced and the reduced temperature syngas is then fed to the first reactor.

11. The method of claim 10 wherein the reverse flow of gas at the first temperature through the second reactor causes $CO_2$ within the syngas to react with the Cu to form copper oxide and CO, thereby regenerating the copper oxide in the second reactor and the reverse flow of gas at the second temperature through the first reactor causes $H_2$ within the syngas to react with the copper oxide to form Cu and $H_2O$, thereby regenerating the copper in the first reactor.

12. The method of claim 10 further comprising monitoring the change of composition of the syngas over time to indicate the reactivity of the material within the reactors and when the reactivity falls below a desired reactivity, reversing the direction of flow through the reactors.

13. The method of claim 1 further comprising:
monitoring the composition of the syngas to determine if the reaction rate of the copper oxidation lags the reaction rate of the copper oxide reduction, and if the reaction rate of the copper oxidation does lag the reaction rate of the copper oxide reduction, decreasing the heat extracted by the second heat exchanger to increase the second temperature.

14. The method of claim 13 wherein monitoring the composition of the syngas to determine if the reaction rate of the copper oxidation lags the reaction rate of the copper oxide reduction comprises identifying a combination of reducing CO value trend with at least one of low $H_2$ value and increased $H_2O$.

15. The method of claim 1 further comprising:
monitoring the composition of the syngas to determine if the reaction rate of the copper oxide reduction lags the reaction rate of the copper oxidation and, if the reaction rate of the copper oxide reduction does lag the reaction rate of the copper oxidation, decreasing the heat extracted by second heat exchanger to decrease the first temperature.

16. The method of claim 15 wherein monitoring the composition of the syngas to determine if the reaction rate of the copper oxidation lags the reaction rate of the copper oxide reduction comprises identifying a combination of high CO value with at least one of increasing $H_2$ value trend and reducing $H_2O$ trend.

17. The method of claim 1 further comprising:
isolating the reactors and the first heat exchanger from the flow of syngas; and
passing nitrogen gas in excess of 650° C. through the reactors to remove carbon deposits therefrom.

18. The method according to claim 17 further comprising vibrating the material within the reactors to assist in the removal of carbon deposits therefrom.

19. The method according to claim 1 further comprising pyrolysing or gasifying organic material to produce hot syngas containing CO in excess of 30%, H2 in excess of 20%, $CO_2$ and $H_2O$.

* * * * *